Oct. 13, 1970  T. C. ZWIEP ET AL  3,533,130

MEANS FOR REMOVING PATELLA

Filed April 30, 1969  3 Sheets-Sheet 1

INVENTORS
THEODORE C. ZWIEP
FERDINAND WEITS
BY Price, Heneveld
Huizenga & Cooper
ATTORNEYS Oct. 13, 1970     T. C. ZWIEP ET AL     3,533,130

MEANS FOR REMOVING PATELLA

Filed April 30, 1969     3 Sheets-Sheet 2

INVENTORS
THEODORE C. ZWIEP
FERDINAND WEITS
BY
ATTORNEYS

United States Patent Office 3,533,130
Patented Oct. 13, 1970

3,533,130
MEANS FOR REMOVING PATELLA
Theodore C. Zwiep, Grand Rapids, and Ferdinand Weits, Holland, Mich., assignors to Prince Manufacturing Company, Holland, Mich., a corporation of Michigan
Continuation-in-part of application Ser. No. 720,052, Apr. 10, 1968. This application Apr. 30, 1969, Ser. No. 820,474
Int. Cl. A22c 17/04
U.S. Cl. 17—1
9 Claims

ABSTRACT OF THE DISCLOSURE

This disclosure relates to a patella or kneecap remover for animal legs and to a method for removing a patella from an animal leg. The patella remover has a plunging blade member and a rotatable exciser which scoops out the kneecap. As the exciser enters the leg, the blade retracts to permit the exciser to shear through the muscle surrounding the patella.

---

This application is a continuation-in-part of Ser. No. 720,052, filed Apr. 10, 1968, now Pat. No. 3,457,586.

This invention relates to patella removing. In one of its aspects it relates to a patella remover having a plunging blade member adapted to plunge into an animal leg adjacent the patella and a rotating exciser which enters the leg from the other side of the patella and scoops and shears out the patella.

In another of its aspects the invention relates to a method for removing a patella from an animal leg in which method a first cutting blade is inserted into the leg adjacent the patella and severs the patella from a portion of the connecting tissue, the blade is withdrawn slightly and a second cutting blade is inserted into the leg at another side of the patella and cuts the remaining portion of the connecting tissue surrounding the patella.

In co-pending Ser. No. 720,052 there is disclosed and claimed an apparatus for removing bones from meat cuts such as ham legs and the like. The meat is removed by suspending the bone from and rotating a plurality of plow members about the bone in contact therewith while bone and the plow blades to plow the meat away from the bone.

In the method disclosed in said co-pending Ser. No 720,052 which method is claimed in a divisional applica- cation, Ser. No. 792,427, filed Jan. 21, 1969, meat is plowed away from the bone by a dull edge plow member while effecting longitudinal movement between the bone and the plow members. In the method, the patella is preferably removed prior to the meat stripping operation.

By various aspects of this invention, one or more of the following, or other, objects can be obtained.

It is an object of this invention to provide a patella or kneecap removing device for animal legs.

It is a further object of this invention to provide a device for quickly and efficiently removing animal patella preparatory to removing meat from animal legs.

It is a further object of this invention to provide a patella remover wherein a first blade cuts through connecting tissue at one side of the patella and a second blade enters the leg from the other side of the patella and scoops out the patella by shearing connecting tissue behind the same.

It is yet another object of this invention to provide a method for removing a patella from an animal leg wherein the patella is cleanly removed in a simple two-step operation.

Other aspects, objects, and the several advantages of this invention are apparent to one skilled in the art from a study of this disclosure, drawings, and the appended claims.

Acocrding to the invention there provided a patella remover for animal legs. The patella remover has a first blade member with a sharpened end for plunging into an animal leg adjacent one side of a patella to sever a portion of the connecting tissue between the bone and the patella. A second blade member is rotatably supported relative to the first blade and adapted to enter the leg from the other side of the patella and by shearing in combina- tion with the first blade, scoop out the patella while the first blade is embedded in the leg. Preferably, means are provided to withdraw a portion of the blade slightly as the second blade enters the leg so as to permit the second blade to cut through the area vacated by a cutting edge of the first blade.

According to another embodiment of the invention, there is provided a method for removing a patella from an animal leg. The method comprises the steps of in- serting a first cutting blade into the leg so as to sever a portion of the connecting tissues between the patella and the bone, withdrawing the blade slightly but main- taining the blade within the leg adjacent the patella, in- serting a second cutting blade into the leg at another side of the patella and moving the second cutting blade around the inner portion of the patella with the edges of the first and second blades shearing the tissue there- between.

The invention will now be described with reference to the accompanying drawing in which.

Figure 1:
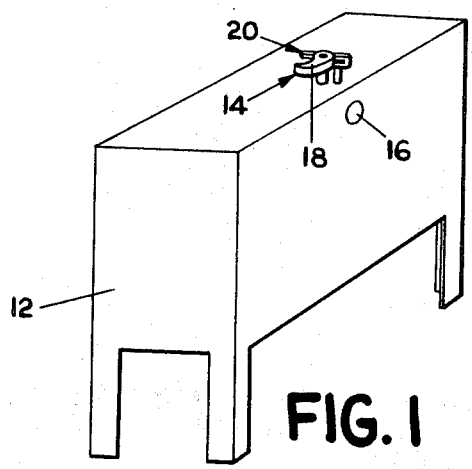
FIG. 1 is a perspective view of a patella removing machine according to the invention.
Figure 4:
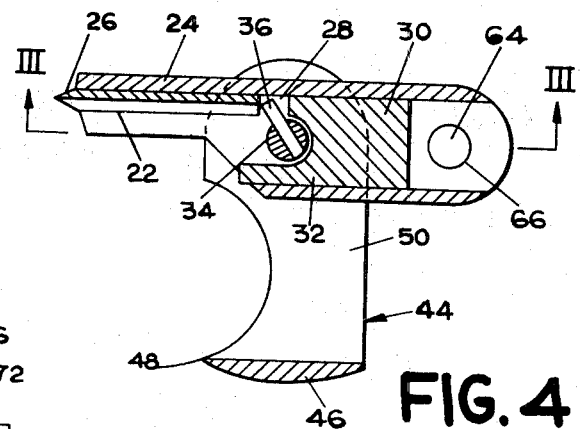
FIG. 4 is a sectional view taken along lines IV—IV of FIG. 3.
Figure 2:
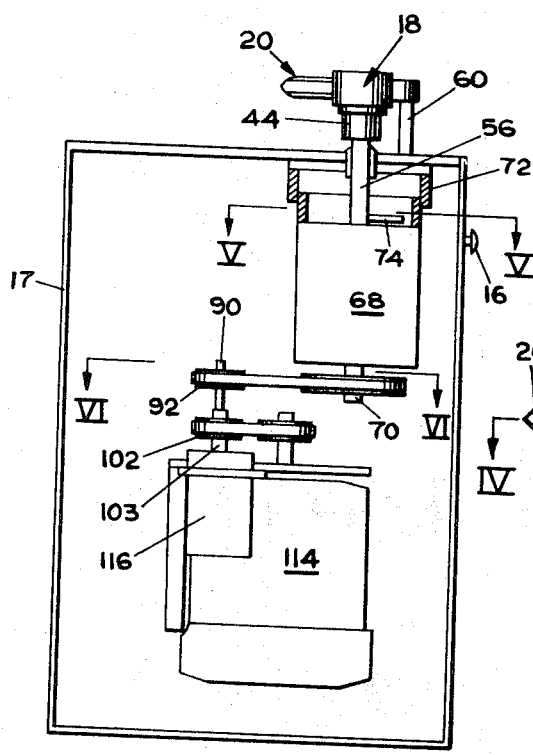
FIG. 2 is a side elevational view in section of the machine shown in FIG. 1.
Figure 3:
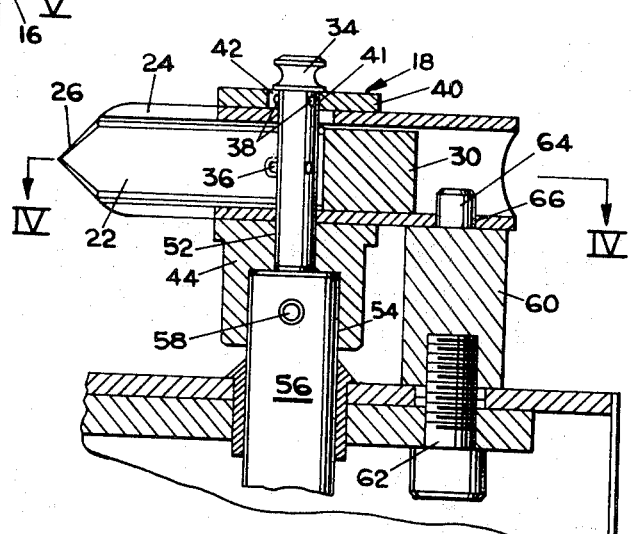
FIG. 3 is an enlarged side elevational view of the cutting and excising components as viewed along lines III—III of FIG. 4.

Referring now in particular to FIGS. 1–5, there is rep- resented a patella removing machine having a base 12 and a patella remover 14. The patella remover is ac- tuated by a button 16. The patella remover comprises an exciser 18 and a plunger 20. The blade 22 has a sharpened end 26 at one end, a slot 28 in the central portion and a solid base at the other end. The base has a circular bore 32 and in the position illustrated in FIGS. 2–4 is adjacent a pivot shaft 34. A pin 36 is fixed to the pivot shaft 34 and extends into slot 28. The pivot shaft 34 has a second pin 38 extending outwardly at the top portion thereof.

The exciser 18 is formed from a base member 44 hav- ing bores 52 and 54, a laterally extending bottom plate, an upright side 46 having a sharpened end 48, and a laterally extending top plate 40. A slot 42 is formed at the upper portion of the top plate 40 and receives pin 38. The top plate has a bore 41 for receiving the pivot shaft 34.

A driving shaft 56 is pinned to base 44 through a removable pin 58.

The blade 22 is slidably received in a shear blade member 24. A stop 60 is fixed to the base 12 through a bolt 62 and has a pin 64 at the top portion thereof extending into bore 66 to fix the end of the shear blade member 24 against rotation.

A high torque gear reduction means 68 supplies power to shaft 56 from an input shaft 70. The high torque gear reduction mechanism is a harmonic drive sold by United Shoe Machinery Company. Any suitable gear reduction mechanism can be used.

Figure 5:
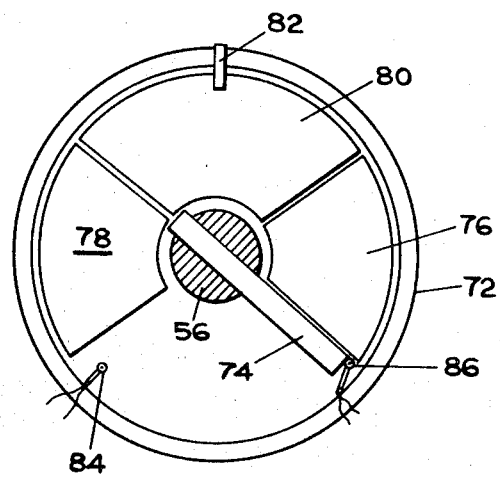
FIG. 5 is a sectional view seen along lines V—V of FIG. 2.

Referring now specifically to FIG. 5, the driving shaft 56 has a bar 74 extending laterally therefrom above the gear reduction means 68. Stop members 76 and 78 are positioned within a casing 72 and held fixedly in place by a backup member 80 which in turn is fixed to the casing 72 through a bolt 82. Limit switch actuators 84 and 86 are provided within the casing and are struck and actuated by the bar 74 as it hits stop members 78 and 76 respectively.

Figure 6:
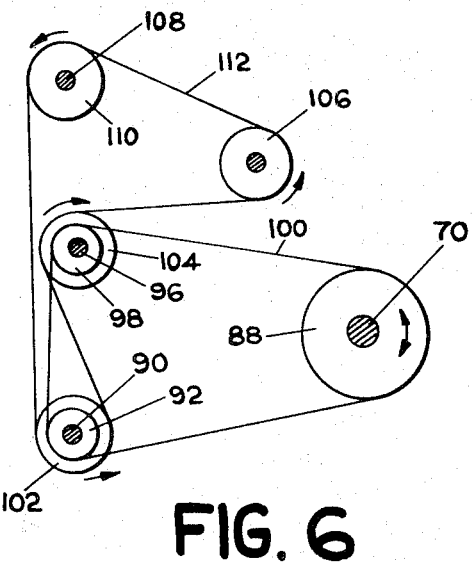
FIG. 6 is a sectional view taken along lines VI—VI of FIG. 2.

Referring again to FIG. 2 and now to FIG. 6, the input shaft 70 is driven by either shaft 90 or 96. The input shaft 70 has a pulley 88 which is engaged by a belt 100. Pulley 92 on shaft 90 and pulley 98 on shaft 96 also contact the belt 100.

Figure 7:
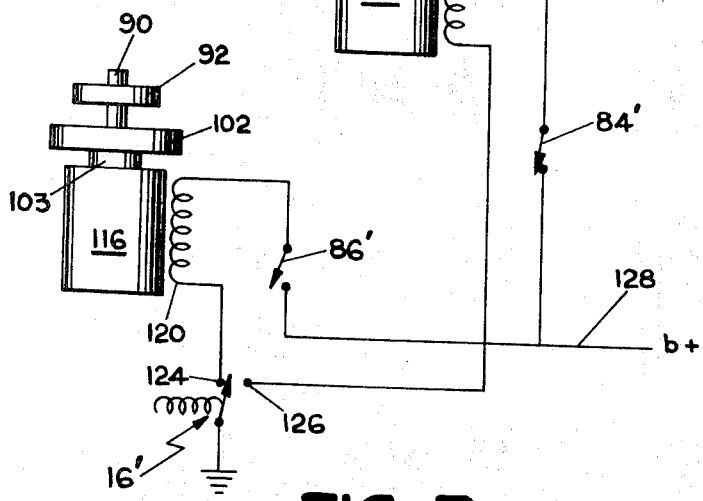
FIG. 7 is a schematic representation of a circuit dia- gram used in the machine illustrated in FIGS. 1–6.

Mounted co-axially with pulley 92 is a pulley 102 which is fixed to an input shaft 103. As seen in FIG. 7, the input shaft 103 is coupled to the shaft 90 through a magnetic clutch 116. In similar manner, pulley 104 is fixed to an input shaft 105 which is coupled to the shaft 96 through a magnetic clutch 118. The pulleys 102 and 104 are engaged by a belt 112 which engages an idler roller 106 and pulley 110 on power shaft 108. A motor 114 (FIG. 2) drives shaft 108.

Referring now specifically to FIG. 7, a coil 120 actuates the magnetic clutch 116 and is in circuit with the limit switch 86' (actuated by limit switch actuator 86) and with a b+ line 128. The circuit is completed when contact 124 is connected to the spring biased switch 16'.

An alternate circuit is made between switch 16, contact 126, coil 122, limit switch 84' (actuated by limit switch 84) and b+ line 128.

Figure 8:
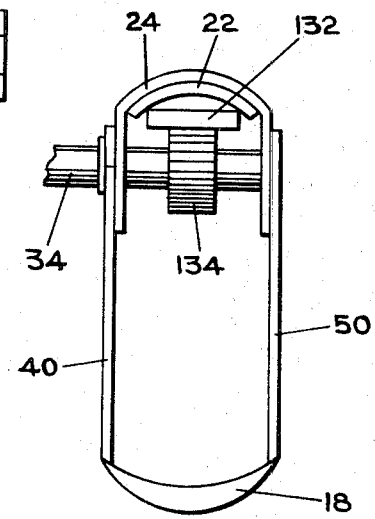
FIG. 8 is an end view of a modified form of the patella removing blades.
Figure 9:
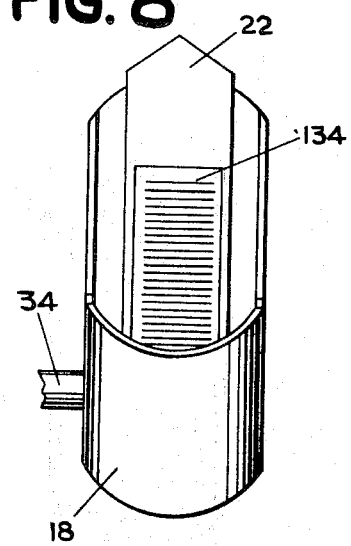
FIG. 9 is a side view of the apparatus illustrated in FIG. 8.

Referring now to FIGS. 8 and 9, there is shown a second embodiment of the invention. In these drawings, like numerals have been used to designate like parts. The blade 22 has mounted thereon a rack 132 which is actuated by a pinion gear 134, fixed on shaft 34. Thus, as shaft 34 rotates, blade 22 is withdrawn.

Figure 11:
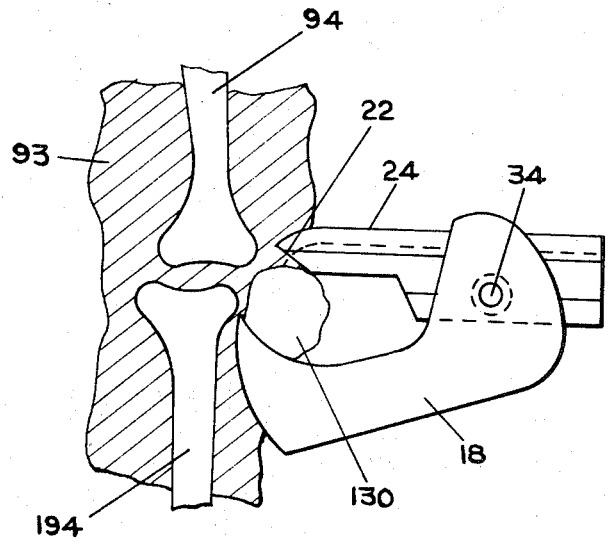
FIG. 11 is a view similar to FIG. 10 illustrating a second step in using the device.
Figure 10:
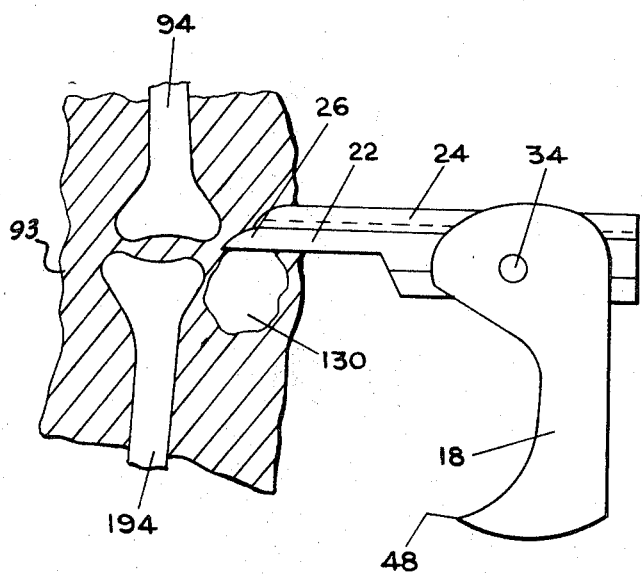
FIG. 10 is a plan view of the patella removing device illustrating the first step in the operation of the device.

The operation of the patella removing device will now be briefly described with reference to FIGS. 10 and 11. The animal leg to have its patella removed is pulled onto blade 22 so that the sharpened end 26 of the blade 22 enters the leg adjacent the patella 130 so as to cut a portion of the connecting tissue between the patella 130 and the femur bone 94. The device is then actuated so as to rotate the exciser 18 to move in a clockwise direction viewed in the FIGS. 10 and 11 so that the exciser blade 48 enters the leg on the other side of the patella 130. As the exciser continues to rotate, the blade 48 cuts the connecting tissue between the tibia bone 194 and the patella 130 and shears completely around the patella 130. The cutting edge 48 of the exciser 18 cooperates with the leading edge of the shear blade member 24 to shear the connecting tissue behind the patella in a scissors-like action. Thus, the exciser acts as a scoop to scoop out the patella while the blades 22 and 24 hold the patella in place. During the rotational operation of the exciser 18, the blade 22 is withdrawn slightly so that the sharpened end 48 can shear through the area cut by the blade 22. The blade 22 is withdrawn either through the rack and pinion gear illustrated in FIGS. 8 and 9 or by the pin 36 in slot 28 (FIGS. 3 and 4). After the exciser has completely sheared through the connecting tissue, the patella 130 will be completely severed from the leg 93. The leg can then be removed from the blade 22 and the exciser 18 returns to the position illustrated in FIG. 10.

The exciser 18 is driven by motor 114 through belt 112, belt 100, input shaft 70, gear reduction means 68 and driving shaft 56. The motor 114 runs continuously and drives power shaft 108 continuously in a counterclockwise direction as viewed in FIG. 6. Belt 112 moves in a counterclockwise direction and rotates pulley wheel 102 in a counterclockwise direction and pulley wheel 104 in a clockwise direction as viewed in FIG. 6. Prior to operation of the patella remover, the shaft 56 will be in the position illustrated in FIG. 5, and the control circuit will be as illustrated in FIG. 7. The actuating switch 16' is biased to contact 124. In this position, bar 74 will contact limit switch actuator 86 to open limit switch 86' so that the shaft 90 will not be turning. Since there is no current passing through coil 122, the shaft 96 will also not be turning.

When the actuating button 16 is pushed, switch 16' moves to contact 126. The current flowing through coil 122 will actuate the magnetic clutch 118 to couple input shaft 105 to shaft 96. The pulley 98 will therefore rotate in a clockwise direction. The pulley 88 will then be rotated in a clockwise direction (viewed in FIG. 6) through the movement of belt 100. Shaft 70 will then move in a clockwise direction to rotate shaft 56 in a clockwise direction (as viewed in FIG. 5) to rotate the exciser in a clockwise direction (as viewed in FIG. 4). The shaft 56 will continue to rotate until bar 74 contacts the limit switch actuator 84 and then stop 78. The movement of the switch actuator 84 will open limit switch 84'. The current will thus cease to flow through coil 122 and shaft 96 will stop turning.

When the actuating button 16 is released, the actuating switch will again strike contact 124 to permit current to flow through coil 120. At this point, the limit switch 86' will be closed. Input shaft 103 will then be coupled to the shaft 90 to cause the pulley 92 to rotate in a counterclockwise direction, thereby causing counterclockwise rotation of pulley 88, input shaft 70, and driving shaft 56. The driving shaft 56 will continue to rotate in a counterclockwise direction until it strikes limit switch actuator 86 and stop 76. The limit switch 86' will then be opened to de-energize the magnetic clutch 116, thereby uncoupling input shaft 103 and shaft 90. Shaft 90 will then discontinue rotating as will input shaft 70 and driving shaft 56.

As is obvious from the foregoing description, the rotation of the exciser 18 in the clockwise direction (as seen in FIG. 4) can be discontinued at any time and the reversing motion commenced. The exciser 18 need not move to a full complete cycle in order to initiate the reverse motion of the exciser 18.

Whereas the invention has been described with reference to removing patella bones from animal legs, it is to be understood that the invention can equally remove other similar bone parts, such as elbow joints from animal shoulder.

Reasonable variation and modification are possible within the scope of the foregoing disclosure, the drawings, and the appended claims without departing from the spirit of the invention.

The embodiments of the invention in which an exclusive property or privilege is claimed are defined as follows.

1. A patella remover for animal legs, said patella remover comprising:
    a first blade member having a sharpened end for plunging into a leg adjacent one side of the patella to sever a portion of the connecting tissue between the bone and patella;
    a second blade member rotatably mounted relative to the first blade member and adapted to enter the leg from the other side of the patella and scoop out the patella while the first blade is embedded in the leg.

2. A patella remover according to claim 1 further comprising means to withdraw said first blade slightly as said second blade enters the leg so as to permit the second blade to shear through the area vacated by the tip of said first blade.

3. A patella remover according to claim 1 wherein said second blade has a cutting blade parallel to the axis of rotation.

4. A patella remover according to claim 1 wherein said second blade is coupled to a shaft for rotation thereon, said first blade is mounted adjacent said shaft; and means on said shaft engage said first blade for moving said blade parallel to said shaft as said shaft rotates.

5. A patella remover according to claim 4 further comprising power means associated with said shaft for rotating said shaft in each direction relative to said first blade member.

6. A patella remover according to claim 5 further comprising control means for said power means so as to stop the movement of said shaft when said second blade means has rotated a predetermined distance and means to reverse the torque on said shaft and return said first blade to its initial position.

7. A patella remover according to claim 1 wherein said first and second blades have rounded and sharpened ends.

8. A patella remover for an animal leg comprising:
means for holding said animal leg in a fixed position;
a scoop mounted for rotation relative to said holding means;
said scoop having a forward cutting edge adapted to penetrate said leg adjacent said patella, to cut behind said patella and scoop said patella from said leg;
power means driving said scoop;
means coupled to said power means for reversing the direction of said power means so as to reverse the direction of rotation of said scoop; and
stop means for said scoop to limit the extent of rotation of said scoop in each direction.

9. A patella remover according to claim 8 further comprising means cooperating with said stop means to de-energize said power means when said scoop has rotated through a predetermined angle.

References Cited
UNITED STATES PATENTS

| | | | |
|---|---|---|---|
| 2,419,424 | 4/1947 | Staab | 17—46 |
| 3,292,679 | 12/1966 | Roth | 17—1 X |
| 3,402,423 | 9/1968 | Helgeson et al. | 17—1 |

LUCIE H. LAUDENSLAGER, Primary Examiner

U.S. Cl. X.R.

17—46

PO-1050
(5/69)

UNITED STATES PATENT OFFICE
CERTIFICATE OF CORRECTION

Patent No. 3,533,130            Dated October 13, 1970

Inventor(s) T. C. Zwiep et al.

It is certified that error appears in the above-identified patent and that said Letters Patent are hereby corrected as shown below:

Column 1, line 44;

After "in contact therewith while" insert --- causing relative longitudinal movement between the ---.

Signed and sealed this 15th day of June 1971.

(SEAL)
Attest:

EDWARD M. FLETCHER, JR.
Attesting Officer

WILLIAM E. SCHUYLER, JR.
Commissioner of Patents